(12) United States Patent
Mori

(10) Patent No.: US 6,666,096 B2
(45) Date of Patent: Dec. 23, 2003

(54) VIBRATOR, VIBRATION GYRO USING THE VIBRATOR, AND ELECTRONIC DEVICE USING THE VIBRATION GYRO

(75) Inventor: Akira Mori, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/263,444

(22) Filed: Oct. 2, 2002

(65) Prior Publication Data

US 2003/0084727 A1 May 8, 2003

(30) Foreign Application Priority Data

Oct. 2, 2001 (JP) .......................... 2001-306428

(51) Int. Cl.[7] .................. G01C 19/56; G01C 19/04
(52) U.S. Cl. ........................ 73/662; 73/504.14
(58) Field of Search .............. 73/662, 504.02, 73/504.03, 504.04, 504.08, 504.12, 504.14, 504.18

(56) References Cited

U.S. PATENT DOCUMENTS 3,878,407 A * 4/1975 Hartemann et al. ........ 333/194
RE33,957 E * 6/1992 Nakazawa et al. .......... 333/195
5,948,981 A * 9/1999 Woodruff .................. 73/514.29
6,253,612 B1 * 7/2001 Lemkin et al. ............ 73/504.02
6,257,059 B1 * 7/2001 Weinberg et al. ......... 73/504.16
6,346,864 B1 * 2/2002 Kadota ...................... 333/133
2002/0020219 A1 * 2/2002 DeRoo et al. ............. 73/504.12

FOREIGN PATENT DOCUMENTS

JP 07-151552 6/1995
JP 07-332988 12/1995

* cited by examiner

Primary Examiner—Hezron Williams
Assistant Examiner—Rose M. Miller
(74) Attorney, Agent, or Firm—Keating & Bennett, LLP

(57) ABSTRACT

A vibrator has a construction that allows its electrodes to be easily formed and requires a smaller number of the assembly man-hours. The vibrator includes a drive electrode and two detection electrodes that are disposed along a length direction thereof, on a planar portion provided on the surface of a vibrating member defined by piezoelectric body. These electrodes constitute interdigital electrode portions defined by mutually opposed comb electrodes which are arranged such that the direction in which the teeth thereof extend is substantially perpendicular to the length direction of the vibrating member.

25 Claims, 7 Drawing Sheets

VIBRATOR, VIBRATION GYRO USING THE VIBRATOR, AND ELECTRONIC DEVICE USING THE VIBRATION GYRO

BACKGROUND OF THE INVENTION

1. Field of the Invention

The present invention relates to a vibrator, a vibration gyro including a vibrator, and an electronic device including a vibration gyro. More particularly, the present invention relates to a vibrator for use in, for example, a vibration gyro which is used in a hand-shake correction device for a video camera, a navigation system or other suitable apparatus, a vibration gyro including the above-described vibrator, and an electronic device including the above-described vibration gyro.

2. Description of the Related Art

As examples of vibrators for a vibration gyro, a vibrator disclosed in Japanese Unexamined Patent Application Publication No. 7-151552 (hereinafter referred to as a first related example), and a vibrator disclosed in Japanese Unexamined Patent Application Publication No. 7-332988 (hereinafter referred to as a second related example) are known.

In the first related example, interdigital electrodes are formed by arranging comb electrodes opposite to each other on the surface of a columnar vibrating member constituted of a piezoelectric body, and polarization processing is performed for the piezoelectric body between the comb electrodes by applying a voltage between the comb electrodes. Furthermore, the vibrating member is caused to be vibrated by applying a voltage between the polarized comb electrodes, and the Coriolis force is detected.

In the second related example, a vibrator is formed by bonding together two piezoelectric substrates, which are polarized in mutually opposite directions, and the vibrator is caused to be vibrated by applying an AC voltage between the electrodes formed on the two surfaces of the vibrator, and the Coriolis force is detected.

However, in the first related example, since it is necessary to form interdigital electrodes on a curved surface, a problem arises in that the formation of the electrodes requires much labor and time, resulting in an increase in the cost. In addition, since the taking-out of leads from the interdigital electrodes becomes three-dimensional, another problem occurs in that the installation of the leads also requires much labor and time, and that the leads might hinder vibration.

In the second related example, it is necessary to bond together the two piezoelectric substrates, and therefore, if appropriate bonding conditions are not satisfied, environmental temperature, moisture, secular changes and other undesired effects might vary the bonding state of the bonded layer. In this case, a problem arises in that the vibration condition of the vibrator varies, resulting in variations in the detection accuracy of the Coriolis force. Additionally, it is necessary to provide support members on both surfaces of the vibrator since the support members each double as a lead. This raises another problem of increased cost due to an increase in assembly man-hours.

SUMMARY OF THE INVENTION

In order to overcome the problems described above, preferred embodiments of the present invention provide a vibrator which is constructed so as to allow its electrodes to be easily formed and requiring a smaller number of assembly man-hours, and also provide a vibration gyro including such a novel vibrator, and an electronic device including such a novel vibration gyro.

According to a preferred embodiment of the present invention, a vibrator includes a vibrating member defined by a piezoelectric body, a drive electrode disposed on the surface of the vibrating member and extending along a length direction of the vibrating member, and two detection electrodes each disposed adjacent to the drive electrode. In this vibrator, the drive electrode and each of the detection electrodes have an interdigital electrode portion defined by mutually opposed comb electrodes which are arranged such that the direction in which the teeth thereof extend is substantially perpendicular to the length direction of the vibrating member.

Preferably, the above-described vibrating member is polarized between the drive electrode and each of the detection electrodes. Alternatively, it is preferable that the above-described vibrating member be polarized in the length direction thereof, and that, in the interdigital electrode portion, the drive electrode be arranged so as to deviate in the length direction of the vibrating member with respect to each of the detection electrodes.

Furthermore, it is preferable that the above-described vibrating member have a planar portion extending along the length direction thereof, and that the drive electrode and the detection electrodes be disposed on the planar portion.

According to another preferred embodiment of the present invention, a vibrator includes a vibrating member defined by a piezoelectric body, a drive electrode disposed on the surface of the vibrating member along a length direction of the vibrating member, a reference electrode disposed adjacent to the drive electrode, and two detection electrodes each disposed adjacent to the reference electrode. In this vibrator, the drive electrode and the reference electrode, and the reference electrode and each of the detection electrodes, have an interdigital electrode portion defined by mutually opposed comb electrodes which are arranged such that the direction in which the teeth thereof extend is substantially perpendicular to the length direction of the vibrating member. Also, the vibrating member is preferably polarized between the drive electrode and the reference electrode, and between the reference electrode and each of the detection electrodes. The vibrating member preferably has a planar portion along the length direction thereof, and the drive electrode, the reference electrode, and the detection electrodes are disposed on the planar portion.

According to another preferred embodiment of the present invention, a vibrator includes a vibrating member defined by a piezoelectric body, a drive electrode disposed on the surface of the vibrating member along a length direction of the vibrating member, a reference electrode disposed adjacent to the drive electrode, and two detection electrodes each disposed adjacent to the reference electrode. In this vibrator, the drive electrode and the reference electrode, and the reference electrode and each of the detection electrodes, preferably have an interdigital electrode portion defined by mutually opposed comb electrodes which are arranged such that the direction in which the teeth thereof extend is substantially perpendicular to the length direction of the vibrating member. Also, the vibrating member is preferably polarized in the length direction thereof, and in the interdigital electrode portion, the drive electrode and each of the detection electrodes are arranged so as to deviate in the length direction of the vibrating member with respect to the reference electrode.

It is preferable that the above-described vibrating member have a planar portion extending along the length direction thereof, and that the drive electrode, the reference electrode, and the detection electrodes be disposed on the planar portion.

In the vibrator according to preferred embodiments of the present invention, it is preferable that support members are fixed to the planar portion, in the vicinity of the vibration nodes of the above-described vibrating member.

Furthermore, another preferred embodiment of the present invention provides a vibration gyro including the novel vibrator according to the various preferred embodiments described above.

Moreover, a further preferred embodiment of the present invention provides an electronic device including the novel gyro according to the preferred embodiment described in the preceding paragraph.

With these arrangements, the vibrator according to various preferred embodiments of the present invention enables a significant reduction in the cost and stabilization of performance.

The vibration gyro according to a preferred embodiment of the present invention allows a significant reduction in the cost and an improvement in the performance.

The electronic device according to another preferred embodiment of the present invention also allows a reduction in the cost and an improvement in the performance.

The above and other elements, characteristics, features, and advantages of the present invention will become clear from the following detailed description of the preferred embodiments of the invention in conjunction with the accompanying drawings.

DETAILED DESCRIPTION OF PREFERRED EMBODIMENTS

Figure 1:
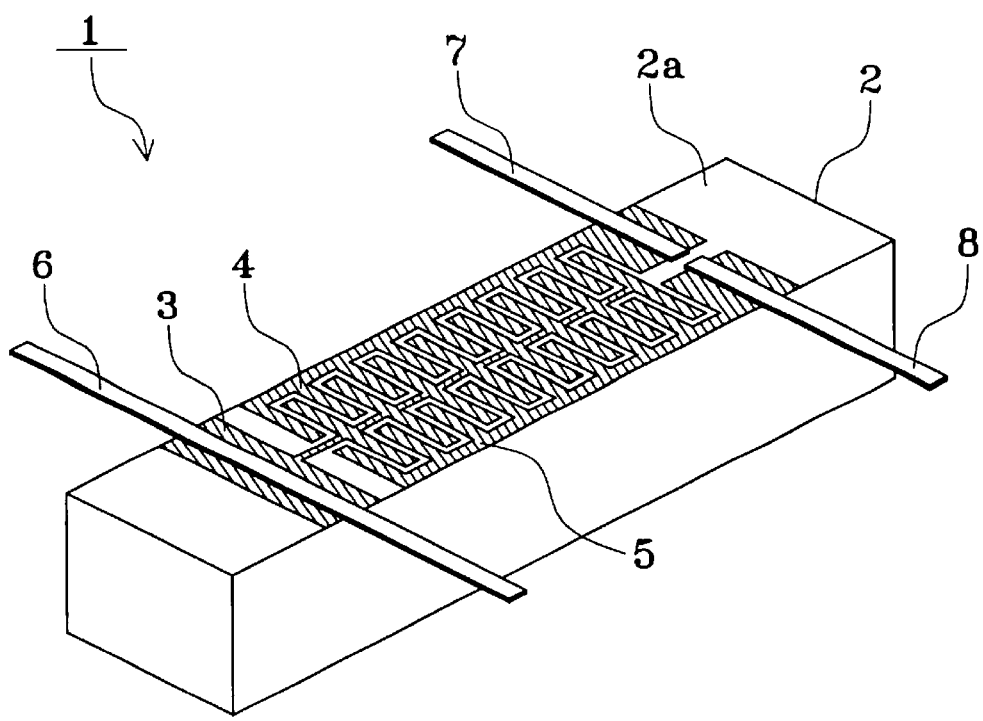
FIG. 1 is a perspective view showing a preferred embodiment of a vibrator according to the present invention.

FIG. 1 is a perspective view showing a preferred embodiment of a vibrator 1 according to the present invention. Referring to FIG. 1, the vibrator 1 preferably includes a substantially rectangular columnar vibrating member 2 having a length direction and a width direction and including a piezoelectric body, a drive electrode 3 and detection electrodes 4 and 5 disposed on one planar portion 2a of the vibrating member 2, and conductive metallic support members 6, 7, and 8 fixed to the planar portion 2a, in the vicinity of the vibration nodes of the vibrating member 2.

Among them, the drive electrode 3 is arranged to extend along a length direction of the vibrating member 2, and the detection electrodes 4 and 5 are arranged to extend along the length direction of the vibrating member 2 as in the case of the drive electrode 3, being adjacent to both sides of drive electrode 3. The combination of the drive electrode 3 and the detection electrode 4 and the combination of the drive electrode 3 and the detection electrode 5 each have an interdigital electrode portion defined by mutually opposing comb electrodes such that the direction in which the teeth thereof extend is substantially perpendicular to the length direction of the vibrating member. The drive electrode 3 is arranged so as to extend up to the position where a support member 6 is fixed, and is electrically connected to the support member 6. The detection electrodes 4 and 5 are arranged so as to extend up to the positions where support member 7 and 8 are fixed, respectively, and are electrically connected to the support member 7 and 8, respectively. Here, the ends of the support members 6, 7, and 8 are fixed to a support substrate supporting the vibrator 1, or, for example, a frame-shaped enclosure. As a result, the vibrator 2 is supported in midair by the support members 6, 7, and 8.

Figure 2:
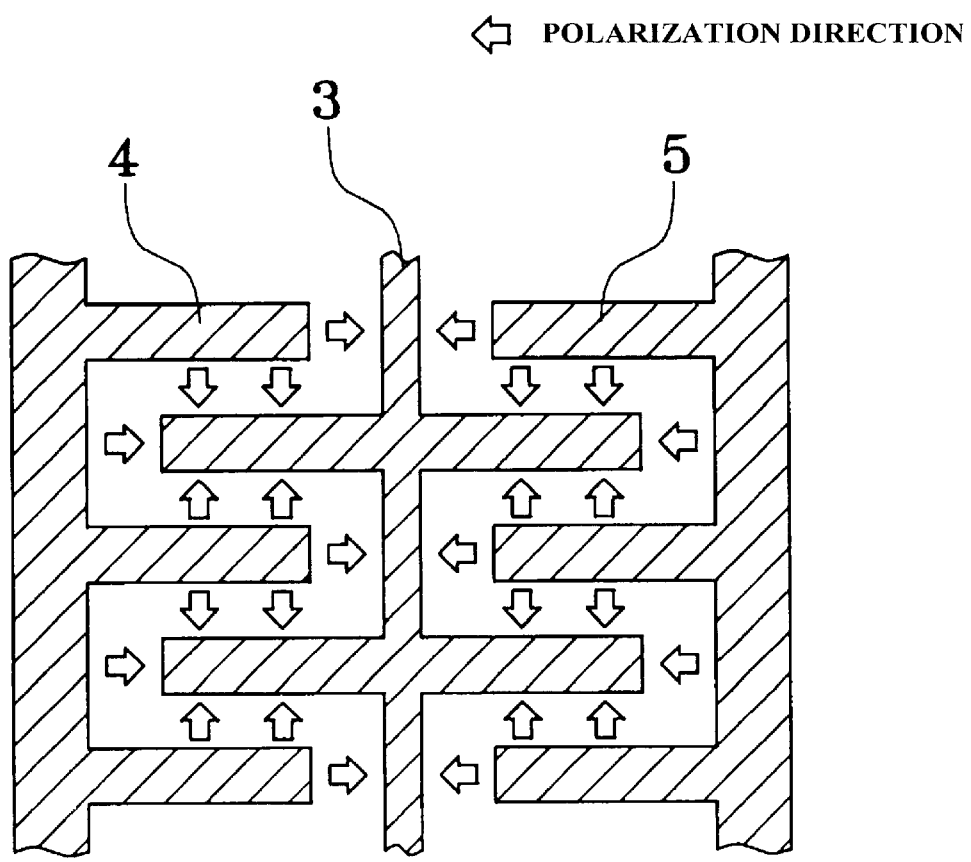
FIG. 2 is a partly enlarged view showing electrodes of the vibrator in FIG. 1.

FIG. 2 is a partly enlarged view illustrating the drive electrode 3 and the detection electrodes 4 and 5 in the vibrator 1 shown in FIG. 1. Here, the arrows in FIG. 1 indicate the polarization directions of the piezoelectric body constituting the vibrator 2, the piezoelectric body being on the surface on which these electrodes are disposed, and in the vicinity thereof. As can be seen from FIG. 2, in the vibrator 1, the piezoelectric body is polarized from each of the detection electrodes 4 and 5 toward the drive electrode 3. Such polarization of the piezoelectric body is realized by applying a high voltage between the drive electrode 3 and each of the detection electrodes 4 and 5, after having formed the drive electrode 3 and the detection electrodes 4 and 5 on the vibrating member 2.

In the vibrator 1, when an AC voltage is applied between the drive electrode 3 and each of the detection electrodes 4 and 5, the piezoelectric body therebetween expands and contracts in the length direction of the vibrating member 2, at the portions where the drive electrode 3 and each of the detection electrodes 4 and 5 are mutually opposed with respect to the length direction of the vibrating member 2. Thereby, the vibrator 1 performs both-end open bending vibration in which the vibrator 1 bends in the direction that is substantially perpendicular to the surface of the planar portion 2a. Herein, the drive electrode 3 and each of the detection electrodes 4 and 5 also have portions where they are mutually opposed with respect to the width direction of the vibrator 2, but since the length of these portions is less than that of the portions where they are mutually opposed with respect to the length direction of the vibrator 2, the vibrator 1 substantially hardly bends in the width direction of the vibrating member 2.

In the vibrator 1 arranged in this manner, since the vibrating member 2 is constituted of a single piezoelectric body, the inconveniences and problems that would occur if two piezoelectric bodies are bonded together, do not occur. Also since the electrodes are disposed on one planar portion 2a of the vibrator 2, the electrodes can be formed much easier than the case where the electrodes are formed on a curved surface. Furthermore, since the support members 6, 7 and 8 are arranged to be fixed to only one planar portion 2a of the vibrating member 2, the installation of the support members is very simple.

Figure 3:
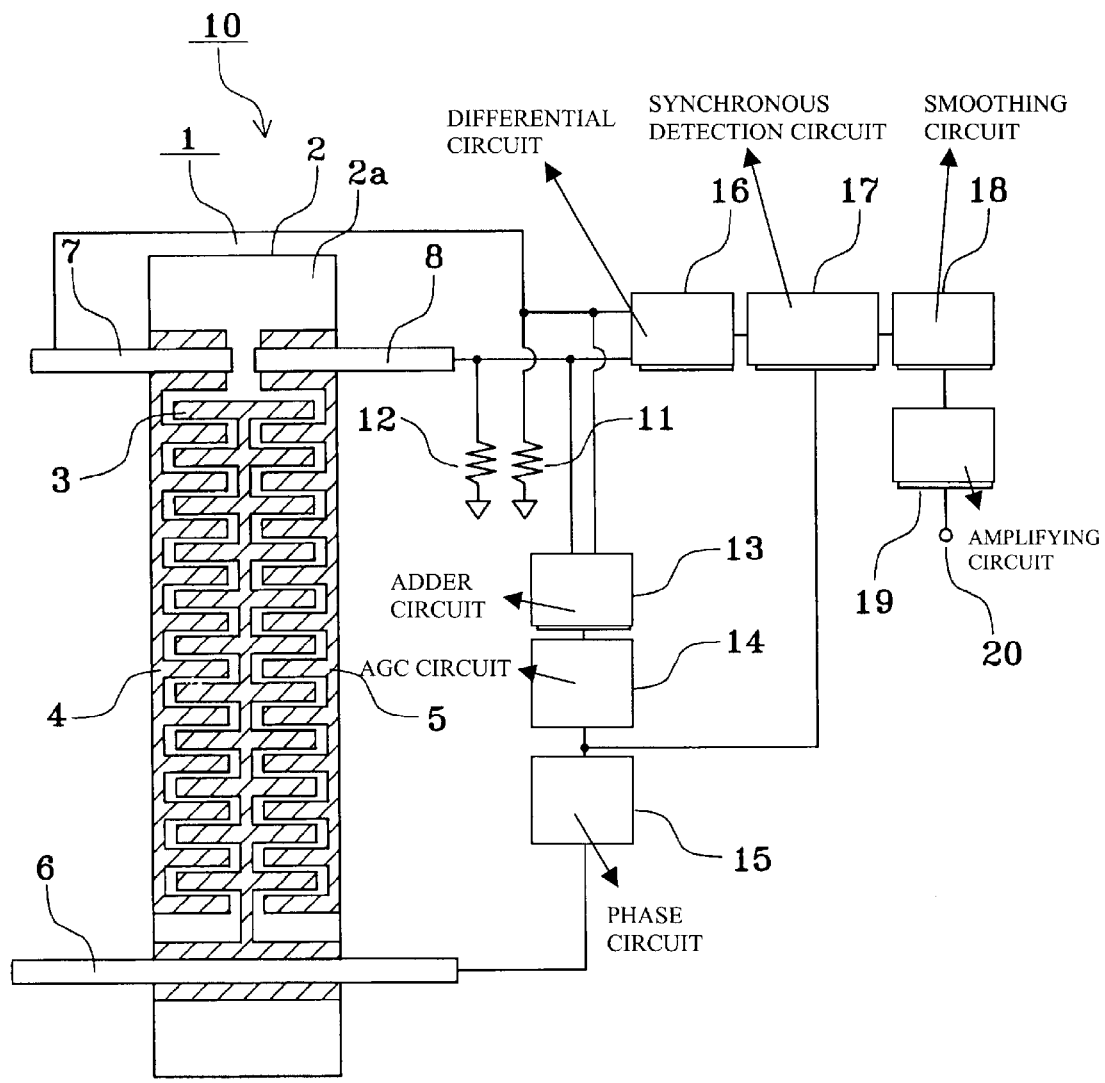
FIG. 3 is a block diagram showing a preferred embodiment of a vibration gyro according to the present invention.

FIG. 3 is a block diagram showing a preferred embodiment of a vibration gyro 10 according to a preferred embodiment of the present invention. Here, as a vibrator, the vibrator 1 according to the preferred embodiment of the present invention shown in FIG. 1 is used. In FIG. 3, the vibrator 1 is depicted in the form of a plan view.

Referring to FIG. 3, in this vibration gyro 10, the detection electrode 4 is connected to one end of a load resistor 11 through the support member 7 defining a lead, and the other end of the load resistor 11 is grounded. The detection electrode 5 is also connected to one end of a load resistor 12 through the support member 8 defining a lead, and the other end of the load resistor 12 is grounded. The one end of the load resistor 11 and that of the load resistor 12 are connected to respective two inputs of an adder circuit 13. The output of the adder circuit 13 is connected to the drive electrode 3 through an AGC circuit 14 and a phase circuit 15 in succession, and further through the support member 6 defining a lead. The one end of the load resistor 11 and that of the load resistor 12 are further connected to two respective inputs of a differential circuit 16, and the output of the differential circuit 16 is connected to a synchronous detection circuit 17. An output of the AGC circuit 14 is also connected to the synchronous detection circuit 17 in order to input a synchronizing signal (detecting signal) thereto. The output of the synchronous detection circuit 17 is connected to an output terminal 20 through a smoothing circuit 18 and an amplifying circuit 19 in succession.

In the vibration gyro 10 arranged in this manner, a self-excited oscillation circuit is constituted of a closed loop including the vibrator 1, the adder circuit 13, the AGC circuit 14, and the phase circuit 15. Thereby, the vibrator 1 performs bending vibration in the direction that is substantially perpendicular to the planar port 2a. When a rotating angular velocity such that the length direction of the vibrating member 2 constitutes a rotational axis, is applied to the vibrator 1 vibrating in a bending mode, the vibrator 1 is vibrated in the width direction (i.e., the direction that is substantially perpendicular to the length direction of the vibrating direction 2, and that is substantially parallel to the surface of the planar portion 2a) by the Coriolis force. By this vibration in the width direction, signals with phases mutually opposed by the Coriolis force, in addition to in-phase signals based on the bending vibration by a drive are outputted from the detection electrodes 4 and 5. Signals created by the Coriolis force are exclusively taken out by the differential circuit 16, and the signals are synchronously detected by the synchronous detection circuit 17. Then, the signals are smoothed by the smoothing circuit 18, and after having been amplified by the amplification circuit 19, the signals are taken out from the output terminal 20 as DC voltages according to the Coriolis force.

In the vibration gyro 10 arranged in this way, since the vibrator 1 according to a preferred embodiment of the present invention is used, and a significant reduction in the cost and an improvement in the performance are achieved.

Figure 4:
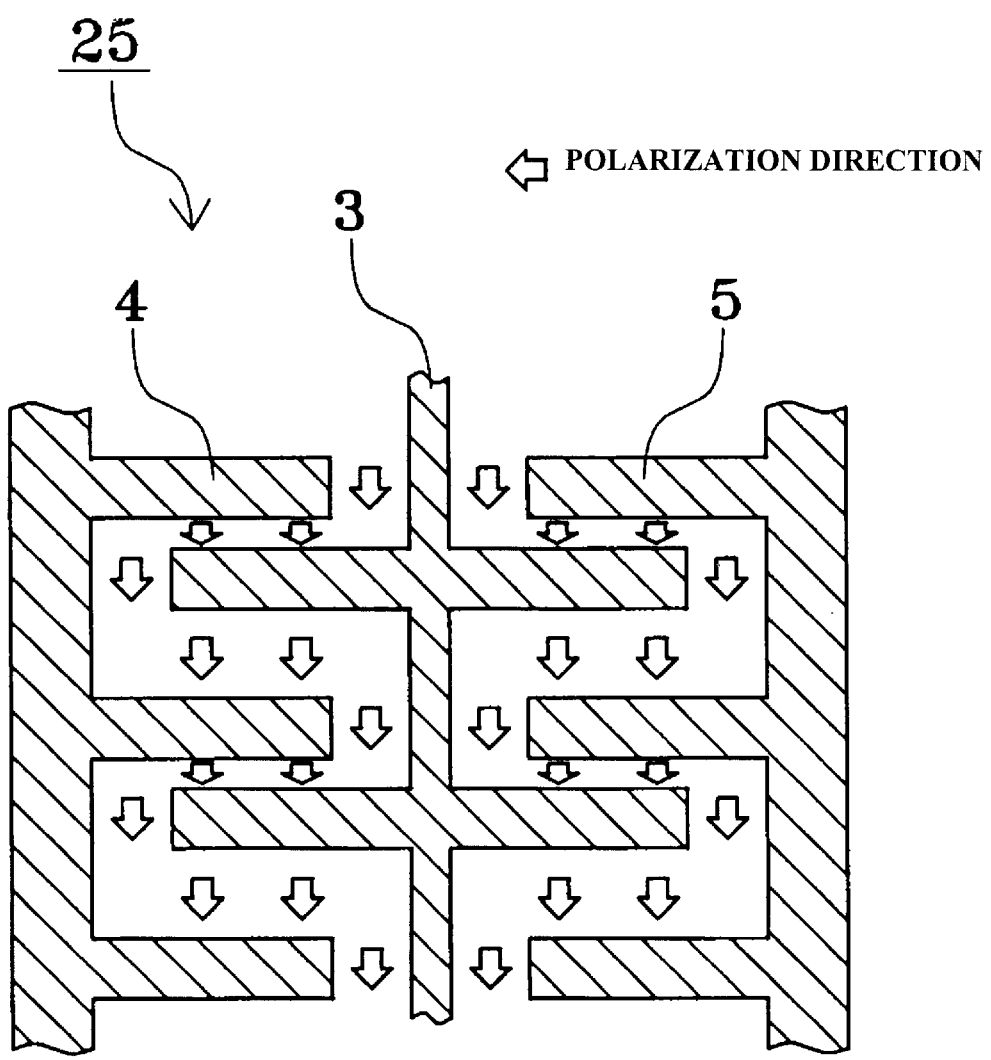
FIG. 4 is a partly enlarged view showing electrodes of another preferred embodiment of a vibrator according to the present invention.

FIG. 4 shows another preferred embodiment 25 of a vibrator according to the present invention. FIG. 4 is a partly enlarged view exclusively showing a drive electrode 3 and detection electrodes 4 and 5 in interdigital electrode portions. The entire configuration of the vibrator is preferably the same as that of the vibrator 1 shown in FIG. 1.

Referring to FIG. 4, in the vibrator 25, comb electrodes of the drive electrode 3 are arranged so as to be deviated in the length direction of the vibrating member with respect to the comb electrodes of the detection electrodes 4 and 5. Simultaneously, unlike the case of the vibrating member 2 in the vibrator 1, on the surface where at least the electrodes are disposed, the entire piezoelectric body of the vibrating member is polarized equally in the length direction of the vibrating member. Unlike the case of the vibrator 1, such polarization of the piezoelectric body is implemented by applying a voltage to the vibrating member 2 in the length direction thereof by any means before or after electrode formation, instead of performing polarization processing making use of the drive electrode 3 and the detection electrodes 4 and 5.

In the vibrator 25, when an AC voltage is applied between the drive electrode 3 and each of the detection electrodes 4 and 5, the directions of expansion and contraction at the places where the drive electrode 3 and each of the detection electrodes 4 and 5 are mutually adjacent, becomes opposite to the directions of expansion and contraction at the places where they are mutually distant, at the portions where the drive electrode 3 and each of the detection electrodes 4 and 5 are mutually opposed with respect to the length direction of the vibrating member. However, at the places where the drive electrode 3 and each of the detection electrodes 4 and 5 are mutually adjacent, the piezoelectric body therebetween strongly expands and contracts in the length direction, and conversely, at the places where the drive electrode 3 and each of the detection electrodes 4 and 5 are mutually distant, the piezoelectric body therebetween weakly expands and contracts in the length direction. As a result, the expansion and contraction at the places where the drive electrode 3 and each of the detection electrodes 4 and 5 are mutually adjacent, becomes substantially predominant. This is because, at the places where two electrodes are adjacent to each other, the electric field applied to the piezoelectric body is stronger. Thereby, the vibrator 25 performs both-end open bending vibration in which the vibrator 25 bends in the direction that is substantially perpendicular to the surface of the planar portion of the vibrating member.

Since the vibrator 25 arranged in this way has much the same configuration as that of the vibrator 1, the vibrator 25 can achieve the same effects as that of the vibrator 1.

In the above-described preferred embodiments of the present invention, a drive electrode and detection electrodes are preferably disposed on the planar portion provided on the columnar vibrator. However, the forming method for these electrodes is not necessarily limited to the foregoing method. For example, these electrodes may be disposed on the side surface of a substantially cylindrical vibrator.

Figure 5:
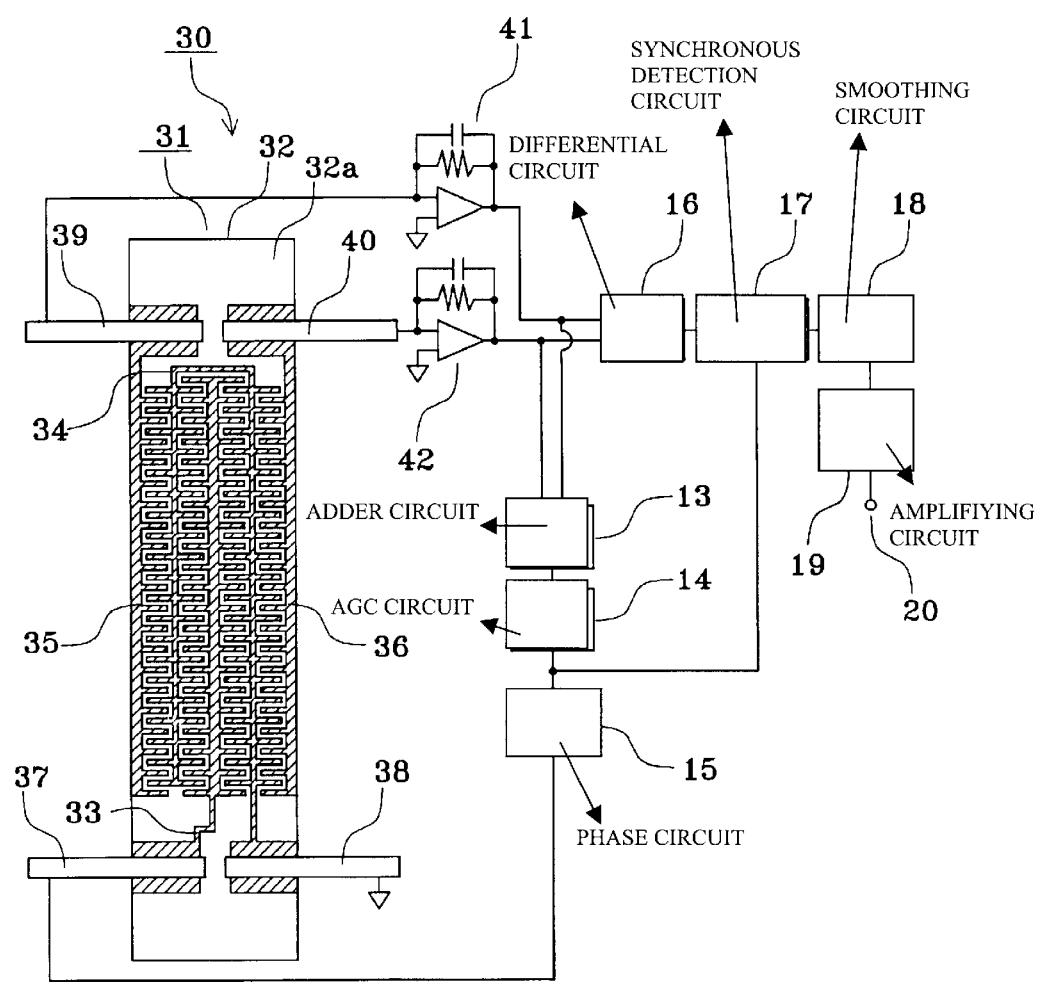
FIG. 5 is a block diagram showing another preferred embodiment of a vibration gyro according to the present invention.

FIG. 5 is a block diagram showing another preferred embodiment of a vibration gyro 30 according to the present invention. Here, the vibration gyro 30 includes a vibrator 31, which is still another preferred embodiment of a vibrator of the present invention. In FIG. 5, the vibrator 31 is depicted in the form of a plan view. Here, in FIG. 5, the same reference numerals are used to denote the same or equivalent portions as those shown in FIG. 3, and the description thereof is omitted.

Referring to FIG. 5, the vibrator 31 includes a substantially rectangular columnar vibrating member 32 including a piezoelectric body, a drive electrode 33, a reference electrode 34, and detection electrodes 35 and 36 disposed on one planar portion 32a of the vibrating member 32, and conductive metallic support members 37, 38, 39, and 40 stuck to the planar portion 32a, in the vicinity of the vibration nodes of the vibrating member 32.

Figure 6:
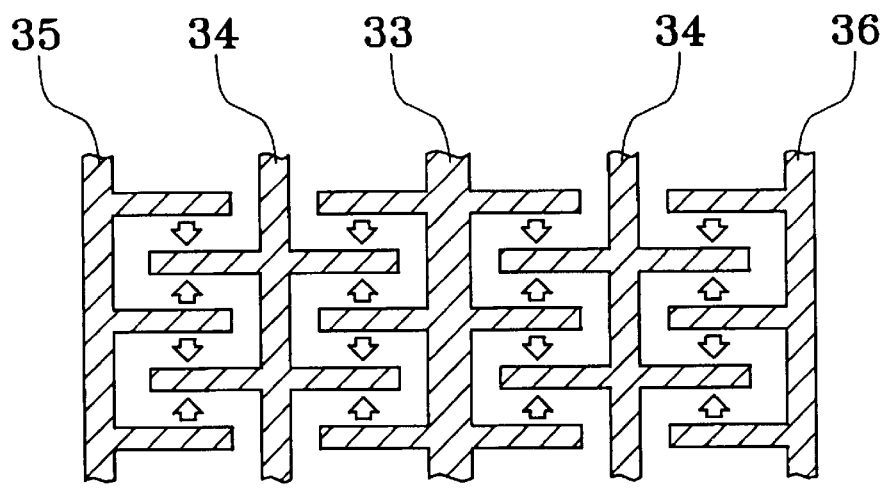
FIG. 6 is a partly enlarged view showing electrodes of still another vibrator of a preferred embodiment of the present invention, the vibrator being included in the vibration gyro in FIG. 5.

FIG. 6 is a partly enlarged view illustrating the drive electrode 33, the reference electrode 34, and the detection electrodes 35 and 36 in the vibrator 31 shown in FIG. 5. Referring to FIG. 6, the combination of the drive electrode 33 and the reference electrode 34, the combination of the reference electrode 34 and the detection electrode 35, and the combination of the reference electrode 34 and the detection electrode 36 each constitute an interdigital electrode portion defined by mutually opposed comb electrodes which are arranged such that the direction in which the teeth thereof is substantially perpendicular to the length direction of the vibrating member. Here, arrows indicate the polarization directions of the piezoelectric body constituting the vibrator 32 on the surface where the electrodes are disposed. As can be seen from FIG. 6, on the surface where at least interdigital electrodes on the vibrating member 32 are disposed, and in the vicinity thereof, the piezoelectric body is polarized from the drive electrode 33 and each of the detection electrodes 35 and 36 toward the reference electrode 34. Such polarization of the piezoelectric body is implemented by applying a high voltage between the drive electrode 33 and the detection electrodes 35 and 36, and the reference electrode 34, after having formed the drive electrode 33, the reference electrode 34, and the detection electrodes 35 and 36 on the vibrating member 32.

In the vibrator 31 arranged in this way, the inconveniences and problems that would occur if two piezoelectric bodies are bonded together, do not occur, as in the case of the vibrator 1. Also since the electrodes are formed on one planar portion 32a of the vibrator 32, the electrodes can be formed very easily. Furthermore, since support members 37, 38, 39, and 40 are arranged to be fixed to the one planar portion 32a of the vibrating member 32, the installation of the support members is very simple.

In the vibrator 31, when an AC voltage is applied between the drive electrode 33 and the reference electrode 34, the piezoelectric body therebetween expands and contracts in the length direction of the vibrating member 32, at the portions where the drive electrode 33 and the reference electrode 34 are mutually opposed with respect to the length direction. Thereby, the vibrator 31 performs both-end open bending vibration in which the vibrator 31 bends in the direction that is substantially perpendicular to the surface of the planar portion 32a. Herein, the drive electrode 33 and the reference electrode 34 also have portions where they are mutually opposed with respect to the width direction of the vibrator 32, but since the length of these portions is less than that of the portions where they are mutually opposed with respect to the length direction of the vibrator 2, the vibrator 1 hardly bends in the width direction of the vibrator 32.

When a rotating angular velocity such that the length direction of the vibrating member 32 constitutes a rotational axis, is applied to the vibrator 31 vibrating in a bending mode, the vibrator 31 is also vibrated in the width direction by the Coriolis force. By this vibration in the width direction, signals with phases that are mutually opposed by the Coriolis force, in addition to in-phase signals based on bending vibration by a drive occur between the detection electrode 35 and the reference electrode 34, and between the detection electrode 36 and the reference electrode 34.

Returning now to the vibration gyro 30, in the vibration gyro 30 shown in FIG. 5, the detection electrode 35 is connected to a charge amplifier 41 through the support member 39 defining a lead, and the output thereof is connected to each of the adder circuit 13 and the differential circuit 16. The detection electrode 36 is also connected to a charge amplifier 42 through the support member 40 defining a lead, and the output thereof is connected to each of the adder circuit 13 and the differential circuit 16. Also, the output of the phase circuit 15 is connected to the drive electrode 33 through the support member 37 defining a lead. The reference electrode 34 is grounded through the support member 38 defining a lead.

Also in the vibration gyro 30 arranged in this manner, by causing the vibrator 31 to vibrate in a bending mode by self-excitation oscillation, an output according to the Coriolis force can be obtained, as in the case of the vibration gyro 10. In the vibration gyro 30, since the vibrator 31 according to preferred embodiments of the present invention is used, a significant reduction in the cost and an improvement in the performance are realized.

The vibrator 31 is arranged so that the piezoelectric body is polarized after the electrodes have been formed, as in the case of the vibrator 1. Alternatively, however, as in the case of the vibrator 25 corresponding to the vibrator 1, a vibrator may be used in which the piezoelectric body of a vibrating member is polarized on the surface where at least electrodes are disposed, in the length direction of the vibrating member, and in which comb electrodes of a drive electrode and each detection electrode are arranged so as to be deviated in the length direction of the vibrating member with respect to the comb electrodes of a reference electrode. Such a vibrator also achieves effects and advantages that are similar to that of the vibrator 31.

When the piezoelectric body of the vibrating member is polarized in the length direction thereof as described above, the electrodes doe not necessarily need to be disposed on the planar portion of the vibrator. For example, the electrodes may be disposed on the side surface of a substantially cylindrical vibrator.

Figure 7:
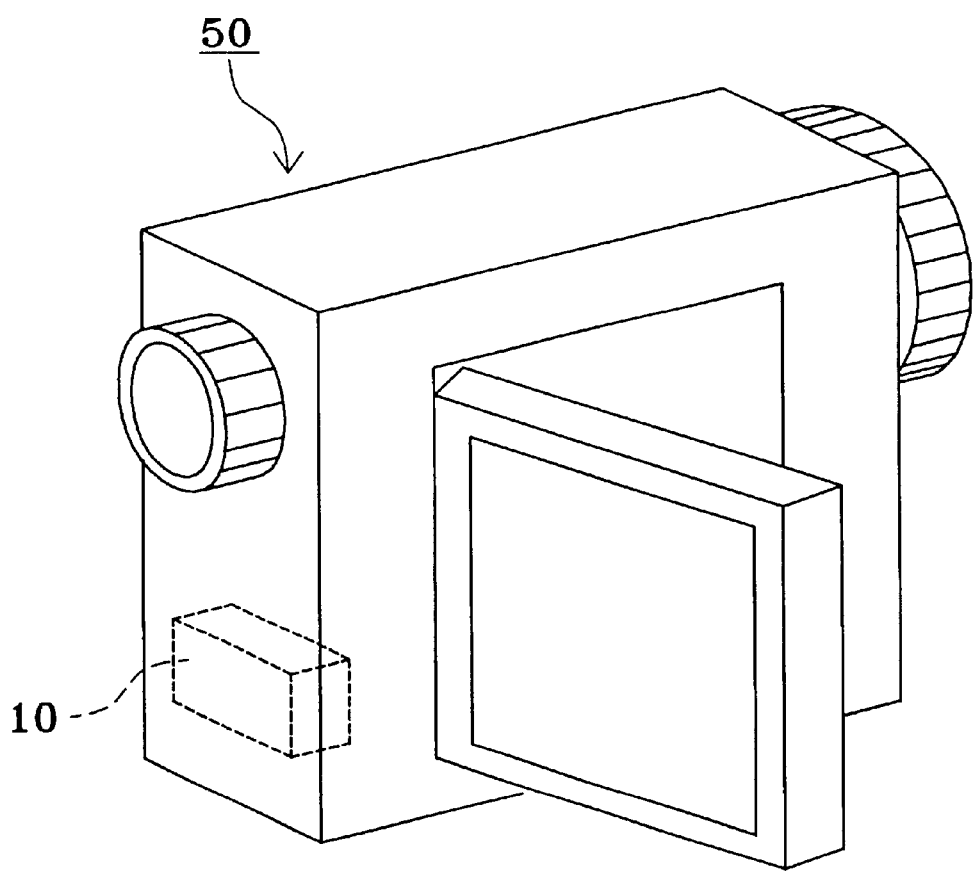
FIG. 7 is a perspective view showing a preferred embodiment of an electronic device according to the present invention.

FIG. 7 is a perspective view showing a video camera 50 as a preferred embodiment of an electronic device according to the present invention. In FIG. 7, the video camera 50 includes a vibration gyro 10 according to a preferred embodiment of the present invention for correcting handshake.

In the video camera 50 arranged in this manner, since the vibration gyro 10 according to preferred embodiments of the present invention is used, a significant reduction in the cost and an improvement in the performance are achieved.

The electronic device according to preferred embodiments of the present invention is not limited to the video camera. The present invention can be applied to every electronic device including a vibration gyro, such as a digital camera using a vibration gyro for hand-shake correction as in the case of the video camera, a navigation system for position detection, a car turnover detection system, and other suitable apparatuses.

The vibrator according to preferred embodiments of the present invention includes a vibrating member defined by a piezoelectric body, a drive electrode disposed on the surface of the vibrating member along a length direction of the vibrating member; two detection electrodes each disposed adjacent to the drive electrode, and as desired, a reference electrode provided between the drive electrode and the detection electrodes. These electrodes constitute interdigital electrode portions defined by mutually opposed comb electrodes which are arranged such that the direction in which the teeth thereof extend is substantially perpendicular to the length direction of the vibrating member. Furthermore, these electrodes are preferably disposed on a planar portion provided on the vibrating member. Thereby, it is possible to reduce the cost and to stabilize the performance.

According to the vibration gyro of another preferred embodiment of the present invention, use of the vibrator of the present invention allows a reduction in the cost and an improvement in the performance.

Also, according to the electronic device of a further preferred embodiment of the present invention, use of the vibration gyro of the present invention enables a reduction in the cost and an improvement in the performance.

While the present invention has been described with reference to what are at present considered to be the preferred embodiments, it is to be understood that various changes and modifications may be made thereto without departing from the present invention in its broader aspects and therefore, it is intended that the appended claims cover all such changes and modifications that fall within the true spirit and scope of the invention.

What is claimed is:

1. A vibrator, comprising:
    a vibrating member including a piezoelectric body and having a length direction and a width direction;
    a drive electrode disposed on the surface of said vibrating member and extending along the length direction of said vibrating member; and
    two detection electrodes each disposed adjacent to said drive electrode;
    wherein said drive electrode and each of said detection electrodes have an interdigital electrode portion defined by mutually opposed comb electrodes which are arranged such that the direction in which the teeth thereof extend is substantially perpendicular to the length direction of said vibrating member.

2. A vibrator according to claim 1, wherein said vibrating member is polarized between said drive electrode and each of said detection electrodes.

3. A vibrator according to claim 1, wherein said vibrating member is polarized in the length direction thereof, and wherein, in said interdigital electrode portion, said drive electrode is arranged so as to be deviated in the length direction of said vibrating member with respect to each of said detection electrodes.

4. A vibrator according to claim 1, wherein said vibrating member has a planar portion extending along the length direction thereof, and wherein said drive electrode and said detection electrodes are disposed on said planar portion.

5. A vibrator according to claim 4, wherein support members are fixed to said planar portion, in the vicinity of vibration nodes of said vibrating member.

6. A vibrator according to claim 1, wherein the vibrating body has a substantially rectangular columnar shape.

7. A vibrator according to claim 1, wherein the drive electrode and each of the detection electrodes have portions where they are mutually opposed with respect to the length direction of the vibrating member, and the drive electrode and each of the detection electrodes have portions where they are mutually opposed with respect to the width direction of the vibrating member.

8. A vibrator according to claim 7, wherein the length of the portions where the drive electrode and each of the detection electrodes are mutually opposed with respect to the width direction of the vibrating member is less than that of the portions where the drive electrode and each of the detection electrodes are mutually opposed with respect to the length direction of the vibrating body.

9. A vibration gyro comprising a vibrator according to claim 1.

10. An electronic device comprising a vibration gyro according to claim 9.

11. A vibrator, comprising:
    a vibrating member including a piezoelectric body and having a length direction and a width direction;
    a drive electrode disposed on the surface of said vibrating member and extending along the length direction of said vibrating member;
    a reference electrode disposed adjacent to said drive electrode; and
    two detection electrodes each disposed adjacent to said reference electrode;
    wherein said drive electrode and said reference electrode, and said reference electrode and each of said detection electrodes, have an interdigital electrode portion defined by mutually opposing comb electrodes which are arranged such that the direction in which the teeth thereof extend is substantially perpendicular to the length direction of said vibrating member;
    wherein said vibrating member is polarized between said drive electrode and said reference electrode, and between said reference electrode and each of said detection electrodes; and
    wherein said vibrating member has a planar portion extending along the length direction thereof, and wherein said drive electrode, said reference electrode, and said detection electrodes are disposed on said planar portion.

12. A vibrator according to claim 11, wherein support members are fixed to said planar portion, in the vicinity of vibration nodes of said vibrating member.

13. A vibrator according to claim 11, wherein the vibrating body has a substantially rectangular columnar shape.

14. A vibrator according to claim 11, wherein the drive electrode and each of the detection electrodes have portions where they are mutually opposed with respect to the length direction of the vibrating member, and the drive electrode and each of the detection electrodes have portions where they are mutually opposed with respect to the width direction of the vibrating member.

15. A vibrator according to claim 14, wherein the length of the portions where the drive electrode and each of the detection electrodes are mutually opposed with respect to the width direction of the vibrating member is less than that of the portions where the drive electrode and each of the detection electrodes are mutually opposed with respect to the length direction of the vibrating body.

16. A vibration gyro comprising a vibrator according to claim 11.

17. An electronic device comprising a vibration gyro according to claim 16.

18. A vibrator, comprising:
    a vibrating member including a piezoelectric body and having a length direction and a width direction;
    a drive electrode disposed on the surface of said vibrating member and extending along the length direction of said vibrating member;
    a reference electrode disposed adjacent to said drive electrode; and
    two detection electrodes each disposed adjacent to said reference electrode;
    wherein said drive electrode and said reference electrode, and said reference electrode and each of said detection electrodes, have an interdigital electrode portion defined by mutually opposed comb electrodes which are arranged such that the direction in which the teeth thereof extend is substantially perpendicular to the length direction of said vibrating member;

wherein said vibrating member is polarized in the length direction thereof, and wherein, in said interdigital electrode portion, said drive electrode and each of said detection electrodes are arranged so as to be deviated in the length direction of said vibrating member with respect to said reference electrode.

19. A vibrator according to claim 18, wherein said vibrating member has a planar portion extending along the length direction thereof, and wherein said drive electrode, said reference electrode, and said detection electrodes are disposed on said planar portion.

20. A vibrator according to claim 19, wherein support members are fixed to said planar portion, in the vicinity of vibration nodes of said vibrating member.

21. A vibrator according to claim 18, wherein the vibrating body has a substantially rectangular columnar shape.

22. A vibrator according to claim 18, wherein the drive electrode and each of the detection electrodes have portions where they are mutually opposed with respect to the length direction of the vibrating member, and the drive electrode and each of the detection electrodes have portions where they are mutually opposed with respect to the width direction of the vibrating member.

23. A vibrator according to claim 22, wherein the length of the portions where the drive electrode and each of the detection electrodes are mutually opposed with respect to the width direction of the vibrating member is less than that of the portions where the drive electrode and each of the detection electrodes are mutually opposed with respect to the length direction of the vibrating body.

24. A vibration gyro comprising a vibrator according to claim 18.

25. An electronic device comprising a vibration gyro according to claim 24.

* * * * *